United States Patent
Dua et al.

(10) Patent No.: US 11,138,476 B2
(45) Date of Patent: Oct. 5, 2021

(54) ORGANIZING IMAGES ASSOCIATED WITH A USER

(71) Applicant: Google LLC, Mountain View, CA (US)

(72) Inventors: Robin Dua, San Francisco, CA (US); Sujith Ravi, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/368,561

(22) Filed: Mar. 28, 2019

(65) Prior Publication Data

US 2019/0220708 A1 Jul. 18, 2019

Related U.S. Application Data

(63) Continuation of application No. 15/839,739, filed on Dec. 12, 2017, now Pat. No. 10,248,889, which is a continuation of application No. 14/980,835, filed on Dec. 28, 2015, now Pat. No. 9,881,236.

(51) Int. Cl.

| | |
|---|---|
| *G06K 9/62* | (2006.01) |
| *G06K 9/52* | (2006.01) |
| *G06F 16/50* | (2019.01) |
| *G06Q 30/06* | (2012.01) |

(52) U.S. Cl.
CPC .......... *G06K 9/6267* (2013.01); *G06F 16/50* (2019.01); *G06K 9/52* (2013.01); *G06Q 30/0633* (2013.01)

(58) Field of Classification Search
CPC ..... G06K 9/6267; G06K 9/52; G06Q 30/0633
See application file for complete search history.

(56) References Cited

U.S. PATENT DOCUMENTS

| | | | |
|---|---|---|---|
| 8,873,867 B1 | 10/2014 | Alldrin et al. | |
| 9,349,077 B2* | 5/2016 | Capuozzo | G06K 9/00288 |
| 2008/0278438 A1 | 11/2008 | Brown et al. | |

(Continued)

FOREIGN PATENT DOCUMENTS

| | | |
|---|---|---|
| CN | 103069415 | 4/2013 |
| EP | 2402867 | 1/2012 |

(Continued)

OTHER PUBLICATIONS

European Patent Office, International Search Report for International Patent Application No. PCT/US2016/06842, dated May 15, 2017, 5 pages.

(Continued)

*Primary Examiner* — David F Dunphy
(74) *Attorney, Agent, or Firm* — IP Spring

(57) ABSTRACT

A method includes identifying images associated with a user, where the image is identified as at least one of captured by a user device associated with the user, stored on the user device associated with the user, and stored in cloud storage associated with the user. The method also includes for each of the images, determining one or more labels, wherein the one or more labels are based on at least one of metadata and a primary annotation. The method also includes generating a mapping of the one or more labels to one or more confidence scores, wherein the one or more confidence scores indicate an extent to which the one or more labels apply to corresponding images. The method also includes interacting with the user to obtain identifying information that is used to categorize one or more of the images.

20 Claims, 8 Drawing Sheets

(56) References Cited

U.S. PATENT DOCUMENTS

| | | | |
|---|---|---|---|
| 2012/0047145 A1 | 2/2012 | Heidasch | |
| 2012/0158686 A1* | 6/2012 | Hua | G06F 16/5866 707/706 |
| 2012/0226602 A1* | 9/2012 | Narcisse | G06Q 30/02 705/39 |
| 2013/0046648 A1 | 2/2013 | Calman et al. | |
| 2013/0121540 A1 | 5/2013 | Garcia et al. | |
| 2013/0262588 A1* | 10/2013 | Barak | G06K 9/00221 709/204 |
| 2015/0186425 A1 | 7/2015 | Chang | |
| 2015/0331929 A1 | 11/2015 | El-Saban et al. | |
| 2016/0373657 A1 | 12/2016 | Goetzke et al. | |

FOREIGN PATENT DOCUMENTS

| | | |
|---|---|---|
| EP | 2902941 | 8/2015 |
| KR | 10-2012-0058538 | 6/2012 |
| KR | 10-2015-0038375 | 4/2015 |
| KR | 20150038375 | 4/2015 |
| WO | 2011017557 | 2/2011 |

OTHER PUBLICATIONS

European Patent Office, Written Opinion for International Patent Application No. PCT/US2016/068428, dated May 15, 2017, 5 pages.
European Patent Office, International Search Report for International Patent Application No. PCT/US2016/068426, dated May 10, 2017, 6 pages.
European Patent Office, Written Opinion for International Patent Application No. PCT/US2016/068426, dated May 10, 2017, 6 pages.
International Bureau of WIPO, International Preliminary Report on Patentability for International Patent Application No. PCT/US2016/068428, dated Jul. 3, 2018, 6 pages.
International Bureau of WIPO, International Preliminary Report on Patentability for International Patent Application No. PCT/US2016/068426, dated Jul. 3, 2018, 7 pages.
USPTO, First Action Interview, Pre-Interview Communication for U.S. Appl. No. 15/839,739, dated Oct. 2018, 11 pages.
USPTO, First Action Interview, Pre-Interview Communication for U.S. Appl. No. 14/980,835, dated Jan. 12, 2017, 13 pages.
USPTO, Final Office Action for U.S. Appl. No. 14/980,835, dated Jun. 21, 2017, 14 pages.
USPTO, Non-final Office Action for U.S. Appl. No. 14/980,790, dated Apr. 17, 2018, 16 pages.
USPTO, Final Office Action for U.S. Appl. No. 14/980,790, dated Sep. 24, 2018, 16 pages.
USPTO, First Action Interview, Office Action Summary for U.S. Appl. No. 14/980,835, dated Mar. 21, 2017, 17 pages.
USPTO, Final Office Action for U.S. Appl. No. 14/980,790, dated Dec. 26, 2017, 26 pages.
USPTO, First Action Interview, Pre-Interview Communication for U.S. Appl. No. 14/980,790, dated May 15, 2017, 6 pages.
USPTO, Notice of Allowance for U.S. Appl. No. 14/980,835, dated Sep. 20, 2017, 7 pages.
USPTO, Notice of Allowance for U.S. Appl. No. 15/839,739, dated Nov. 20, 2018, 8 pages.
USPTO, First Action Interview, Office Action Summary for U.S. Appl. No. 14/980,790, dated Sep. 19, 2017, 9 pages.
KIPO, Notice of Allowance (with English translation) for Korean Patent Application No. 10-2018-7007531, dated Dec. 23, 2019, 3 pages.
EPO, Communication Pursuant to Article 94(3) EPC for European Patent Application No. 16829366.0, dated May 9, 2019, 6 pages.
KIPO, Notice of Preliminary Rejection for Korean Patent Application No. 10-2018-7007531, dated May 16, 2019, 6 pages.
EPO, Summons to Attend Oral Proceedings for European Patent Application No. 16829366.0, dated Dec. 4, 2020, 7 pages.
IPO, First Examination Report for Indian Patent Application No. 201847009152, dated Jan. 26, 2021, 7 pages.
CNIPA, First Office Action for Chinese Patent Application No. 201680053597.3, dated Apr. 21, 2021, 11 pages.
EPO, Examining Divisional Preliminary Opinion for European Patent Application No. 16829366.0, dated Apr. 9, 2021, 10 pages.
EPO, Communication under Rule 71(3) EPC for European Patent Application No. 16829366.0, dated May 17, 2021, 7 pages.

* cited by examiner

ORGANIZING IMAGES ASSOCIATED WITH A USER

CROSS REFERENCE TO RELATED APPLICATIONS

The present application is a continuation of U.S. patent application Ser. No. 15/839,739, filed Dec. 12, 2017 and titled ORGANIZING IMAGES ASSOCIATED WITH A USER, which is a continuation of U.S. patent application Ser. No. 14/980,835, filed Dec. 28, 2015 and titled ORGANIZING IMAGES ASSOCIATED WITH A USER (now U.S. Pat. No. 9,881,236), the contents of both of which are incorporated herein by reference in their entirety.

BACKGROUND

With the standardization of cameras in smartphones, consumers are taking more pictures and videos than ever before. It is not uncommon for consumers to have hundreds or thousands of photos stored on their mobile devices. These photos are sometimes backed up to a cloud storage service, but in many cases the photos remain stored on the mobile device. Users may choose not to backup their photos to the cloud due to the cost associated with using a cloud storage service, high cost of broadband access, lack of broadband connectivity, or other factors.

Users that search for a specific photo or set of photos generally have to manually sift through their images until they find the specific photo or set of photos. There may be no quick way to search for a photo stored in the cloud or on the phone using search terms. Media search engines that employ natural language processing techniques may fail to find the specific photo or set of photos since there may be high variability in the words different users might employ to describe certain features or characteristics in a photo.

SUMMARY

Implementations generally relate to organizing images associated with a user. In some implementations, a method includes identifying images associated with a user, where the image is identified as at least one of captured by a user device associated with the user, stored on the user device associated with the user, and stored in cloud storage associated with the user. The method also includes for each of the images, determining one or more labels, wherein the one or more labels are based on at least one of metadata and a primary annotation. The method also includes generating a mapping of the one or more labels to one or more confidence scores, wherein the one or more confidence scores indicate an extent to which the one or more labels apply to corresponding images. The method also includes interacting with the user to obtain identifying information that is used to categorize one or more of the images.

In some implementations, the method further includes updating the mapping by adding the identifying information to the one or more of the images. In some implementations, the method further includes receiving one or more user-generated search terms from the user for one or more of the images associated with the user, determining an ambiguity in the user-generated search terms, and requesting the user to provide clarifying information to resolve the ambiguity in the user-generated search terms. In some implementations, the method further includes receiving an instruction from the user to send one or more of the images to a person associated with a third-party application, determine a contact profile associated with the person and providing the person with the one or more images based on the contact profile. In some implementations, the one or more labels include a secondary annotation and the secondary annotation is generated by performing label expansion on at least one of the metadata and the primary annotation. In some implementations, interacting with the user includes transmitting an image and an audio prompt to provide the identifying information about an entity in the image. In some implementations, the method further includes receiving a request from the user to purchase an item related to an entity in one of the images and purchasing the item for the user.

In some implementations, a system includes one or more processors coupled to a memory, an image processing module stored in the memory and executable by the one or more processors, the image processing module operable to identify images associated with a user and, for each of the images, determine one or more labels, wherein the one or more labels are based on at least one of metadata, a primary annotation, and a secondary annotation and the secondary annotation is generated by performing label expansion on at least one of the metadata and the primary annotation. The system may further include an indexing module stored in the memory and executable by the one or more processors, the indexing module operable to generate a mapping of the one or more labels to one or more confidence scores, wherein the one or more confidence scores indicate an extent to which the one or more labels apply to corresponding images. The system may further include an image assistant stored in the memory and executable by the one or more processors, the image assistant operable to receive a first search query that includes one or more user-generated search terms that correspond to one or more of the one or more labels and provide the user with a corresponding image. The indexing module may be further operable to interact with the user to obtain identifying information that is used to categorize one or more of the images and instruct the indexing module to update the mapping by adding the identifying information to the one or more of the images.

In some implementations, the method may include means for identifying images associated with a user, where the image is identified as at least one of captured by a user device associated with the user, stored on the user device associated with the user, and stored in cloud storage associated with the user. The method also includes for each of the images, means for determining one or more labels, wherein the one or more labels are based on at least one of metadata and a primary annotation. The method also includes means for generating a mapping of the one or more labels to one or more confidence scores, wherein the one or more confidence scores indicate an extent to which the one or more labels apply to corresponding images. The method also includes means for interacting with the user to obtain identifying information that is used to categorize one or more of the images.

Other aspects may include corresponding methods, systems, apparatus, and computer program products.

The system and methods described below advantageously create a structured format for organizing images that improves the ability to search for the images using a search query and reduces the computational expense and time needed to retrieve images that match the search query.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
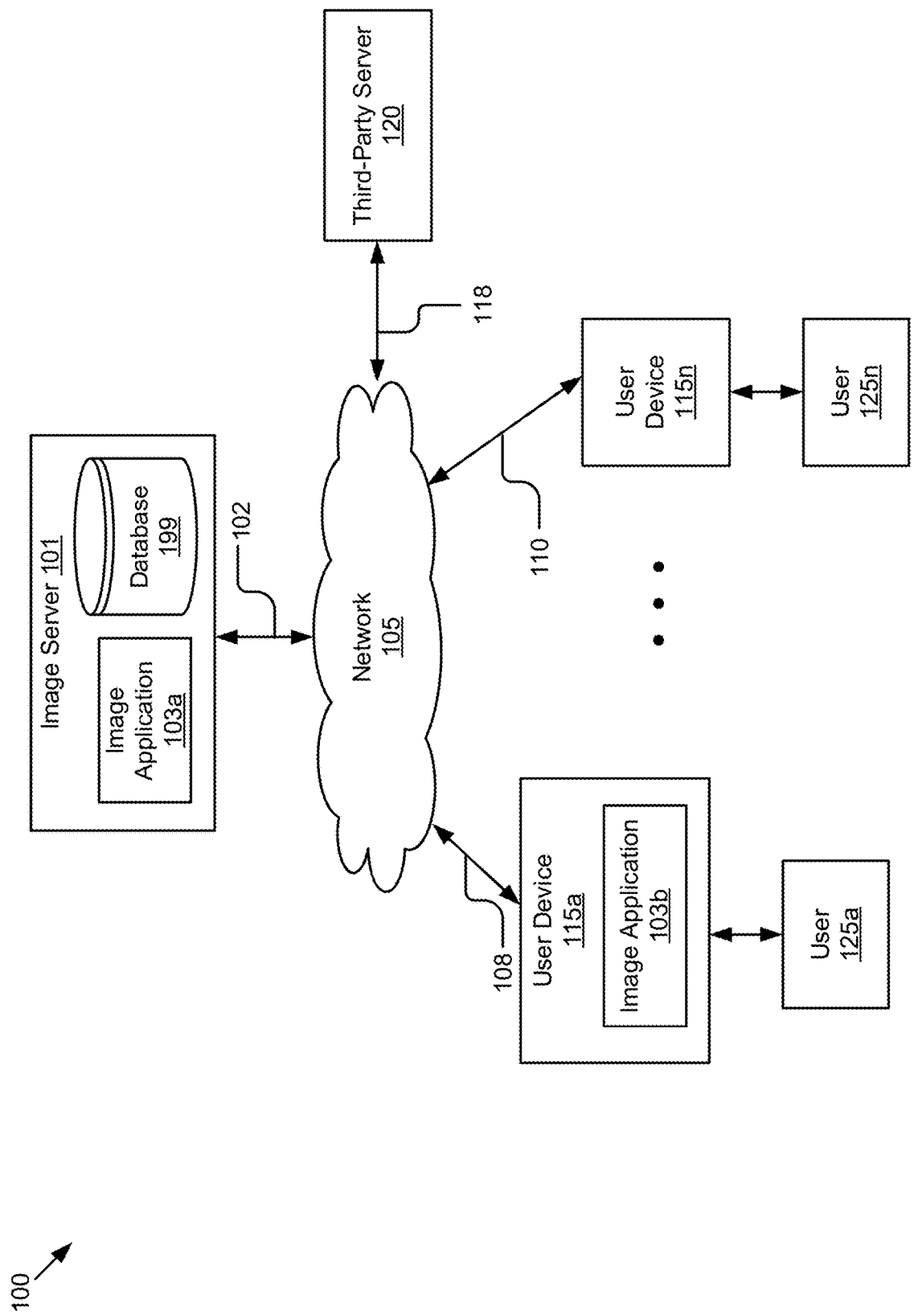
FIG. 1 illustrates a block diagram of an example system that organizes images.

Some implementations may include a system and method to organize images that are associated with a user. For example, the images may be captured by a user device associated with the user, stored on the user device associated with the user, stored in cloud storage and associated with the user, or a combination of images captured by the user device, stored on the user device, and stored in cloud storage. In some implementations, the images may be associated with the user if the images were captured by the user or uploaded to the cloud by the user. In some implementations, an image may be associated with the user if the image was annotated to include the user's identification, for example, if the user was tagged in the image by the user or another person. For each of the images, one or more labels may be determined. The one or more labels may be based on at least one of metadata, a primary annotation, and a secondary annotation. An index may be generated by mapping the one or more labels to one or more confidence scores. A confidence score may indicate an extent to which a label applies to a corresponding image.

Metadata may be based on data generated by a user device, such as an image capture device used to capture an image, or data provided by a user. A primary annotation may be generated by performing image recognition to determine one or more of an entity that appears in the image and one or more characteristics associated with the image. For example, the entity may include a landmark or a person in the image, the characteristic may be fog, and the primary annotation may be a description of the landmark (Eiffel Tower), person (Jane Doe), or characteristic (fog). The primary annotation may also be generated from metadata associated with the image based on one or more inferences about what the metadata represents. For example, the metadata may include an indication of altitude at the time the image was captured. Based on the altitude being around 35,000 feet, it may be inferred that the image was captured on an airplane. The primary annotations may include "taken while flying" or "taken on an airplane" to make it easier to search for the image.

A secondary annotation may be generated by identifying a related annotation through label expansion of metadata or a primary annotation associated with the image. Label expansion may include expansion based on a hierarchical taxonomy that includes determining one or more higher-order labels that are broader than the category for the entity, for example, identifying a bulldog and generating dog, animal, and mammal labels. Label expansion may also include expansion based on semantic similarity of the metadata or the primary annotation to other words, such as expanding coffee shop to café, or based on visual similarity, such as expanding puppy to dog. In some implementations, the label expansion may include a combination of both visual and semantic similarity, such as expanding the primary annotation "John sitting on the black Porsche" to generate the secondary annotation "The man sitting on the dark car."

An index may be generated by associating one or more confidence scores to the labels associated with an image and indexing the image, the labels, and the one or more confidence scores. The confidence scores may indicate an extent to which the one or more labels apply to corresponding images. For example, an image of an adult dog may have a confidence score that indicates that the label "puppy" does not apply to the image as closely as the label "dog." The index may be personalized for different users based on the labels and confidence scores determined for images associated with each user. For example, a first user may be associated with a confidence score that indicates a strong association with a "beach" label based on the first user capturing images that are indexed with the "beach" label. A second user may be associated with a confidence score that indicates a strong association with a "café" label based on the second user uploading images that are indexed with the "café" label.

The index may be used in a variety of ways including providing search results to a user that match user-generated search terms, autocompleting a search query, and translating user-generated search terms into categorized search terms to improve the quality of the search results. In some implementations a photo search assistant may organize the user's images, add additional labels to the images, provide information about entities included in the images, use verbal commands to edit images, and order products that appear in the images or order a product that includes the image itself.

In situations in which the systems and methods discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics, social actions or activities, a user's preferences, content created or submitted by a user, a user's current location, etc.). A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or a user's geographic location may be generalized to a larger region so that a particular location of a user cannot be determined.

Example System

FIG. 1 illustrates a block diagram of an example system 100 that organizes images associated with a user. The illustrated system 100 includes an image server 101, user devices 115a, 115n, a third-party server 120, and a network 105. Users 125a-125n may be associated with respective user devices 115a, 115n. In some implementations, the system 100 may include other servers or devices not shown in FIG. 1. In FIG. 1 and the remaining figures, a letter after a reference number, e.g., "115a," represents a reference to the element having that particular reference number. A reference number in the text without a following letter, e.g., "115," represents a general reference to implementations of the element bearing that reference number.

In the illustrated implementation, the entities of the system 100 are communicatively coupled via a network 105. The network 105 may be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth® communication networks, WiFi®, or a cellular communications network for sending and receiving data including via short messaging service (SMS), multimedia messaging service (MMS), hypertext transfer protocol (HTTP), direct data connection, email, etc. Although FIG. 1 illustrates one network 105 coupled to the user devices 115 and the image server 101, in practice one or more networks 105 may be coupled to these entities.

The image server 101 may include a processor, a memory and network communication capabilities. In some implementations, the image server 101 is a hardware server. The image server 101 is communicatively coupled to the network 105 via signal line 102. Signal line 102 may be a wired connection, such as Ethernet, coaxial cable, fiber-optic cable, etc., or a wireless connection, such as Wi-Fi, Bluetooth, or other wireless technology. In some implementations, the image server 101 sends and receives data to and from one or more of the user devices 115a-115n and the third-party server 120 via the network 105. The image server 101 may include an image application 103a and a database 199.

The image application 103a may be code and routines operable to organize images. In some implementations, the image application 103a may be implemented using hardware including a field-programmable gate array (FPGA) or an application-specific integrated circuit (ASIC). In some implementations, the image application 103a may be implemented using a combination of hardware and software.

The database 199 may store one or more indexes for each user, images associated with users, and training data used to create or refine the indexes. The database 199 may also store social network data associated with users 125, information received from the third-party server 120, contact information, etc.

The user device 115 may be a computing device that includes a memory and a hardware processor, for example, a camera, a laptop computer, a desktop computer, a tablet computer, a mobile telephone, a wearable device, a head-mounted display, a mobile email device, a portable game player, a portable music player, a reader device, a television with one or more processors embedded therein or coupled thereto, or other electronic device capable of accessing a network 105.

In the illustrated implementation, user device 115a is coupled to the network 105 via signal line 108 and user device 115n is coupled to the network 105 via signal line 110. Signal lines 108 and 110 may be a wired connection, such as Ethernet, coaxial cable, fiber-optic cable, etc., or a wireless connection, such as Wi-Fi, Bluetooth, or other wireless technology. User devices 115a, 115n are accessed by users 125a, 125n, respectively. The user devices 115a, 115n in FIG. 1 are used by way of example. While FIG. 1 illustrates two user devices, 115a and 115n, the disclosure applies to a system architecture having one or more user devices 115.

In some implementations, the user device 115 can be a mobile device that is included in a wearable device worn by the user 125. For example, the user device 115 is included as part of a clip (e.g., a wristband), part of jewelry, or part of a pair of glasses. In another example, the user device 115 can be a smart watch. The user 125 can view images from the image application 103 on a display of the device worn by the user 125. For example, the user 125 can view the images on a display of a smart watch or a smart wristband.

In some implementations, the image application 103b may be stored on a user device 115a. The image application 103 may include a thin-client image application 103b stored on the user device 115a and an image application 103a that is stored on the image server 101. For example, the image application 103 may include a mobile application that runs on the user device 115a and sends information to the image application 103a stored on the image server 101. For example, the user 125a may capture images using the user device 115a and transmit the images to the image server 101 for the image application 103a. The image application 103a stored on the image server 101 may process the images and send additional information back to the image application 103b stored on the user device 115a. For example, the image application 103a may generate an index for the user based on the images, receive a user query from the image application 103b on the user device 115a, and transmit search results that match the user query to the user device 115a for display.

In some implementations, the image application 103 may be a standalone application stored on the image server 101. A user 125a may access the image application 103 via a web pages using a browser or via other software on the user device 115a. In this implementation, the image application 103b stored on the user device 115a may receive instructions from the image application 103a stored on the image server 101 to display information generated by the image application 103a. In some implementations, the image application 103 may include the same components on the user device 115a as are included on the image server 101. In these implementations, images may be organized by the image server 101 or by the user device 115.

The third-party server 120 may include a processor, a memory and network communication capabilities. In some implementations, the third-party server 120 is a hardware server. The third-party server 120 is communicatively coupled to the network 105 via signal line 118. Signal line 118 may be a wired connection, such as Ethernet, coaxial cable, fiber-optic cable, etc., or a wireless connection, such as Wi-Fi, Bluetooth, or other wireless technology. In some implementations, the third-party server 120 sends and receives data to and from one or more of the image server 101 and the user devices 115a-115n via the network 105.

The third-party server 120 may provide additional information to the image application 103. For example, the third-party server 120 may include a social network application that manages social network profiles, an email application that includes profile images of users, a mapping application that provides longitude and latitude coordinates, an electronic encyclopedia that provides information about entities, a website where products or goods can be purchased, etc.

As long as a user consents to the use of such data, the third-party server 120 may provide the image application 103 with profile information or profile images of a user that the image application 103 may use to identify a person in an image with a corresponding social network profile. In another example, the third-party server 120 may provide the image application 103 with information related to entities identified in the images used by the image application 103. For example, the third-party server 120 may include an electronic encyclopedia that provides information about landmarks identified in the images, an electronic shopping website that provides information for purchasing entities identified in the images, an electronic calendar application that provides, subject to user consent, an itinerary from a user identified in an image, a map application that provides information about nearby locations where an entity in the image can be viewed, a web site for a restaurant where a dish in an image was served, etc.

In some implementations, the image application 103 may share information with the third-party server 120. For example, a user may instruct the image application 103 to "send this picture to Tom." The image application 103 may determine contact information used by the third-party server 120 to identify Tom, such as an email address or a social media handle. The image application 103 may transmit the image to the third-party server 120 using the corresponding email address or the social media handle.

Although the image application 103 is described with reference to images, the implementations described below may work with other types of media including three-dimensional imagery, videos, virtual reality video, holographic video, audio, documents, etc.

Example Computing Device

Figure 2:
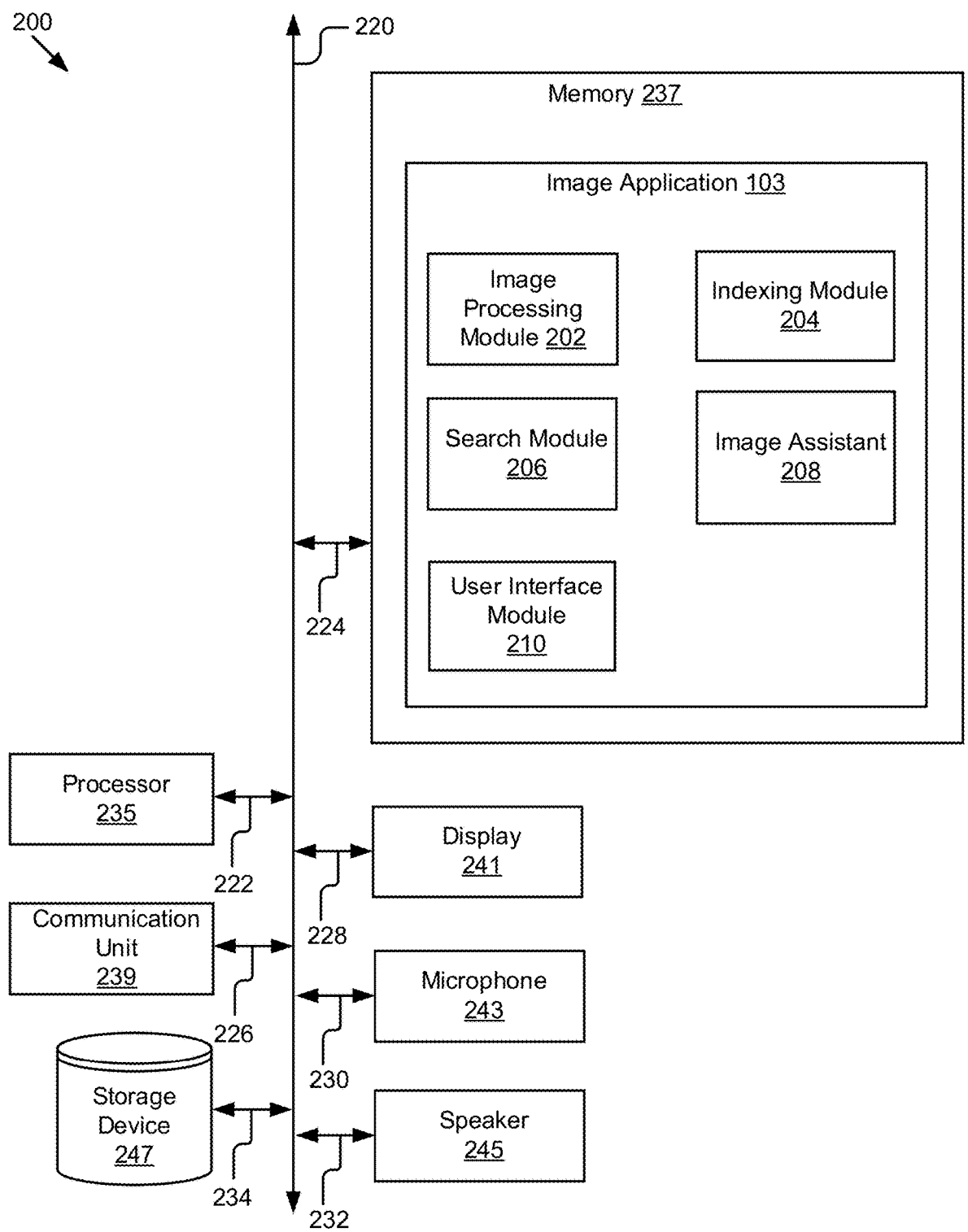
FIG. 2 illustrates a block diagram of an example computing device that organizes images.

FIG. 2 illustrates a block diagram of an example computing device 200 that organizes images. The computing device 200 may be an image server 101 or a user device 115. The computing device 200 may include a processor 235, a memory 237, a communication unit 239, a display 241, a microphone 243, a speaker 245, and a storage device 247. An image application 103 may be stored in the memory 237. The components of the computing device 200 may be communicatively coupled by a bus 220.

The processor 235 includes an arithmetic logic unit, a microprocessor, a general purpose controller or some other processor array to perform computations and provide instructions to a display device. Processor 235 processes data and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations may be part of the computing device 200. The processor 235 is coupled to the bus 220 for communication with the other components via signal line 222.

The memory 237 stores instructions that may be executed by the processor 235 and/or data. The instructions may include code for performing the techniques described herein. The memory 237 may be a dynamic random access memory (DRAM) device, a static RAM, or some other memory device. In some implementations, the memory 237 also includes a non-volatile memory, such as a (SRAM) device or flash memory, or similar permanent storage device and media including a hard disk drive, a floppy disk drive, a compact disc read only memory (CD-ROM) device, a DVD-ROM device, a DVD-RAM device, a DVD-RW device, a flash memory device, or some other mass storage device for storing information on a more permanent basis. The memory 237 includes code and routines operable to execute the image application 103, which is described in greater detail below. The memory 237 is coupled to the bus 220 for communication with the other components via signal line 224.

The communication unit 239 transmits and receives data to and from at least one of the user device 115, the image server 101, and the third-party server 120 depending upon where the image application 103 may be stored. In some implementations, the communication unit 239 includes a port for direct physical connection to the network 105 or to another communication channel. For example, the communication unit 239 includes a universal serial bus (USB), secure digital (SD), category 5 cable (CAT-5) or similar port for wired communication with the user device 115 or the image server 101, depending on where the image application 103 may be stored. In some implementations, the communication unit 239 includes a wireless transceiver for exchanging data with the user device 115, image server 101, or other communication channels using one or more wireless communication methods, including IEEE 802.11, IEEE 802.16, Bluetooth® or another suitable wireless communication method. The communication unit 239 is coupled to the bus 220 for communication with the other components via signal line 226.

In some implementations, the communication unit 239 includes a cellular communications transceiver for sending and receiving data over a cellular communications network including via short messaging service (SMS), multimedia messaging service (MMS), hypertext transfer protocol (HTTP), direct data connection, e-mail or another suitable type of electronic communication. In some implementations, the communication unit 239 includes a wired port and a wireless transceiver. The communication unit 239 also provides other conventional connections to the network 105 for distribution of files and/or media objects using standard network protocols including, but not limited to, user datagram protocol (UDP), TCP/IP, HTTP, HTTP secure (HTTPS), simple mail transfer protocol (SMTP), SPDY, quick UDP internet connections (QUIC), etc.

The display 241 may include hardware operable to display graphical data received from the image application 103. For example, the display 241 may render graphics to display a user interface. The display 241 is coupled to the bus 220 for communication with the other components via signal line 228. Other hardware components that provide information to a user may be included as part of the computing device 200. For example, the computing device 200 may include a speaker for audio interfaces, a vibration or force feedback device, or other types of non-display output devices. In some implementations, such as where the computing device 200 is an image server 101, the display 241 may be optional. In some implementations, the computing device 200 may not include all the components. In implementations where the computing device 200 is a wearable device, the computing device 200 may not include storage device 247. In some implementations, the computing device 200 may include other components not listed here, e.g., one or more cameras, sensors, battery, etc.

The microphone 243 can include hardware for recording audio from a user. For example, the microphone 243 records audio spoken by a user to ask the image application 103 to provide images that match a search query. The microphone 243 may transmit the audio to a computing device 200 operating system, the image application 103, or a separate application to convert the audio to a signal understandable by the image application 103. The microphone 243 is coupled to the bus 220 via signal line 230.

The speaker 245 can include hardware for generating audio for playback. For example, the speaker 245 receives instructions from the image application 103 to generate clarifying questions about the search query. The speaker 245 converts the instructions to audio and generates the audio for the user. The speaker 245 is coupled to the bus 220 via signal line 232.

The storage device 247 may be a non-transitory computer-readable storage medium that stores data that provides the functionality described herein. In implementations where the computing device 200 is the image server 101, the storage device 247 may include the database 199 in FIG. 1. The storage device 247 may be a DRAM device, a SRAM device, flash memory or some other memory device. In some implementations, the storage device 247 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a permanent basis. The storage device 247 is coupled to the bus 220 for communication with the other components via signal line 234.

In the illustrated implementation shown in FIG. 2, the image application 103 includes an image processing module 202, an indexing module 204, a search module 206, an image assistant 208, and a user interface module 210. Other modules and/or configurations are possible.

The image processing module 202 may be operable to process images. In some implementations, the image processing module 202 may be a set of instructions executable by the processor 235 to process images. In some implementations, the image processing module 202 may be stored in the memory 237 of the computing device 200 and can be accessible and executable by the processor 235.

In some implementations, the image processing module 202 receives images associated with the user. The image processing module 202 may determine one or more labels for an image where the one or more labels may include metadata, primary annotations, or secondary annotations. For each of discussion, the different types of labels are discussed below as metadata, primary annotations, and secondary annotations, but once the types of labels are recognized or generated by the image processing module 202, the image processing module 202 treats them as labels that are associated with an image.

The images may be associated with metadata. Exemplary metadata may include, but are not limited to, data generated by a user device 115, such as exchangeable image file format (EXIF) data, and metadata provided by a user. The metadata generated by a user device may include location coordinates, altitude, direction, as an image size, an image type (joint photographic experts group (JPEG), tagged image file format (TIFF), graphics interchange format (GIF), bitmap (BMP), portable network graphics (PNG), etc.), a color depth, an image resolution, an identity of the creator of the image, a date and time (e.g., a timestamp that reflects the time the image was captured), etc. Metadata provided by a user may include the tagging of entities (people, objects, places, etc.).

In some implementations, the image processing module 202 may generate a primary annotation for an image. The image processing module 202 may perform image recognition to identify an entity (e.g., people, objects, or places) in an image and associate a primary annotation with the image that corresponds to the entity. For example, the image processing module 202 may use computer vision, deep neural networks, or other techniques that employ image recognition algorithms to identify objects and characteristics in the image. For example, the image processing module 202 may identify objects including animals, cars, or products, such as a wine bottle label, a watch, a car, a dress, shoes, etc. The image processing module 202 may also identify text, such as by applying optical character recognition (OCR) or another text recognition algorithm to identify text related to the objects, such as text on book covers or signs. In some implementations, the image processing module 202 may add a label to the image based on recognized text. For example, the image processing module 202 may identify a title of a book from the book cover and add a label that includes the book title. The image processing module 202 may identify characteristics that represent attributes of an image, such as "on the beach," "in the rain," "fog," "sunny," "snowing," "inside," "outside," "in front," etc.

The image processing module 202 checks whether user consent (e.g., user permission) has been obtained to apply an image recognition algorithm to an image to identify people in the image and add information about the people (name, identifier, characteristics, etc.) as primary annotations associated with the image. Upon user consent, the image processing module 202 may identify people in the image by comparing the image to other images with the people identified in the other images or publicly available information. The image processing module 202 may, upon user consent, receive additional information for identifying people in the image from a third-party server 120. For example, the image processing module 202 may tentatively identify a person in an image as John and confirm the identity of John by comparing the image to a user profile of John associated with a social network, a device profile associated with the user device 115 (e.g., a media access control (MAC) address), or a website maintained by the third-party server 120 (e.g., where the website provides business profiles of its users).

The image processing module 202 may perform image recognition to determine a characteristic associated with the image. The characteristic may include, for example, sunny, foggy, snowing, or raining. In some implementations, the image processing module 202 may generate a primary annotation by converting metadata to the primary annotation based on inferences. For example, the metadata may include the capture date as "12/25/2014." The image processing module 202 may convert the capture date to "Christmas." The image processing module 202 may convert the metadata to primary annotations based on the propensity of the primary annotation to be used in search strings or natural language queries. For example, metadata may be automatically converted into standard primary annotations that include a date of capture, a time of capture, latitude and/or longitude coordinates at which an image was captured, an altitude at which the image was captured, etc. The process of converting metadata to a primary annotation may be performed by image capture software, the user device 115 that captures the image, or by the processing module 202, which may be stored on the user device 115 or on the image server 101.

In some implementations, the image processing module 202 generates a primary annotation by converting metadata to a primary annotation that makes the image more easily searchable. For example, the image processing module 202 identifies from the metadata latitude and longitude coordinates associated with the image and converts the latitude and longitude coordinates to a semantic location, such as the Eiffel Tower. In another example, the image processing module 202 may determine from metadata where the altitude is 35,000 feet that the image was captured on an airplane. The image processing module 202 may add a primary annotation, such as "taken while flying" or "taken on the airplane" to the image. In yet another example, the image processing module 202 may determine from the latitude and longitude coordinates and other signals that the image was taken while the user was at home. The image processing module 202 may associate a "home" primary annotation with the image. In some implementations, this may be referred to as a place primary annotation.

In some implementations, the image processing module 202 associates a place primary annotation with an image based on identification of entities in the image and a determination that the entity corresponds to a place primary annotation. The place primary annotation may include an identification of a place location associated with a user, a work location associated with a user, an educational institution associated with a user, or a semantic place of interest. The semantic place of interest may include, for example, the Taj Mahal, the Statute of Liberty, the Empire State Building, etc.

The image processing module 202 may determine the place primary annotation based on a semantic location (e.g., from individual information or aggregate information), matching latitude and longitude information to places of interest, or by using a combination of data signals to infer the location or place of interest in an image. The combination of data signals may include combining any of global positioning system (GPS) data, WiFi location data, cellular location data, search history, email data, calendar data, user account profile data, user device 115 data, or other signals. In some implementations, the image processing module 202 receives the data signals from one or more third-party servers 120, such as third-party servers 120 that host email applications, calendar applications, social networks, etc.

In some implementations, the image processing module 202 may identify a user activity to associate with a location and instruct the index module 204 to associate a user activity primary annotation with images that are associated with the location. For example, the image processing module 202 may associate skiing with particular resorts and golfing with particular golf courses. The image processing module 202 may determine how to associate activities with places based on user activities. For example, the image processing module 202 may identify from images that a user went on discrete trips or outings to three different ski resorts based on times and dates of the images. The image processing module 202 may cluster the images from the trips or outings based on skiing as the activity. In some implementations, the image processing module 202 may add a "skiing" primary annotation to any image that is associated with any of the three ski resorts. In some implementations, the image processing module 202 clusters the images as discrete "ski trip" primary annotations.

The image processing module 202 may generate secondary annotations by performing label expansion on metadata or primary annotations. In some implementations, the image processing module 202 generates secondary annotations based on hierarchical expansion, semantic similarity expansion, visual similarity expansion, or a combination of semantic and visual similarity expansion.

In some implementations, the image processing module 202 performs hierarchical expansion based on a hierarchical taxonomy. For example, the image processing module 202 may identify the location of an image from the metadata as being Davisville Village. The hierarchical taxonomy may have locations organized as Davisville Village→Toronto→Ontario→Canada. The image processing module 202 may generate secondary annotations that may be used by the image assistant 208 as a search string to filter photos. Similarly, if the image processing module 202 identifies an entity in the image as the Taj Mahal (i.e., a place of interest), the hierarchical taxonomy may be organized as Taj Mahal→Agra→Uttar Pradesh→India. In yet another example, the image processing module 202 may identify that an image includes a bulldog. The hierarchical taxonomy may have the entity organized as bulldog→dog→animal→mammal. The hierarchical taxonomy may be a commonly accepted standard or a specialized version created by the image application 103. The hierarchical taxonomy may be complex or abbreviated with a few levels of organization.

The image processing module 202 may generate secondary annotations based on semantic similarity expansion by identifying semantically similar terms. For example, the image processing module 202 may use the primary annotation "café" to generate the secondary annotation "coffee shop." The image processing module 202 may generate secondary annotations based on visual similarity expansion by identifying visually similar or related terms for the same entity. For example, the image processing module 202 may use the primary annotation "puppy" to generate the secondary annotation "dog." The image processing module 202 may generate secondary annotations based on a combination of semantic and visual similarity expansion by identifying terms based on both visual and semantic similarity. For example, the image processing module 202 may use the primary annotation "John sitting on the black Porsche" to generate the secondary annotation "The man sitting on the dark car."

In some implementations, the image processing module 202 associates a label (i.e., metadata, a primary annotation, or a secondary annotation) with a boundary of an entity in an image. The image processing module 202 may associate the boundary with information about the entity such that, responsive to receiving a selection within the boundary of the entity, the user interface module 210 provides the user with information about the entity. The selection may include a tap, a double tap within the boundary, a long press within the boundary, a predetermined level of pressure for a press within the boundary, drawing a circle around the entity, hovering over the entity with a mouse, etc.

In some implementations, responsive to the search module 206 receiving an indication that the entity was selected, the search module 206 identifies the corresponding label, and retrieves information about the selected entity based on the corresponding label. The search module 206 may retrieve the information from a search engine, a third-party server 120, such as a third-party server 120 that generates a server-hosted knowledge graph, etc. The search module 206 may instruct the user interface module 210 to provide the user with the additional information.

Figure 3A:
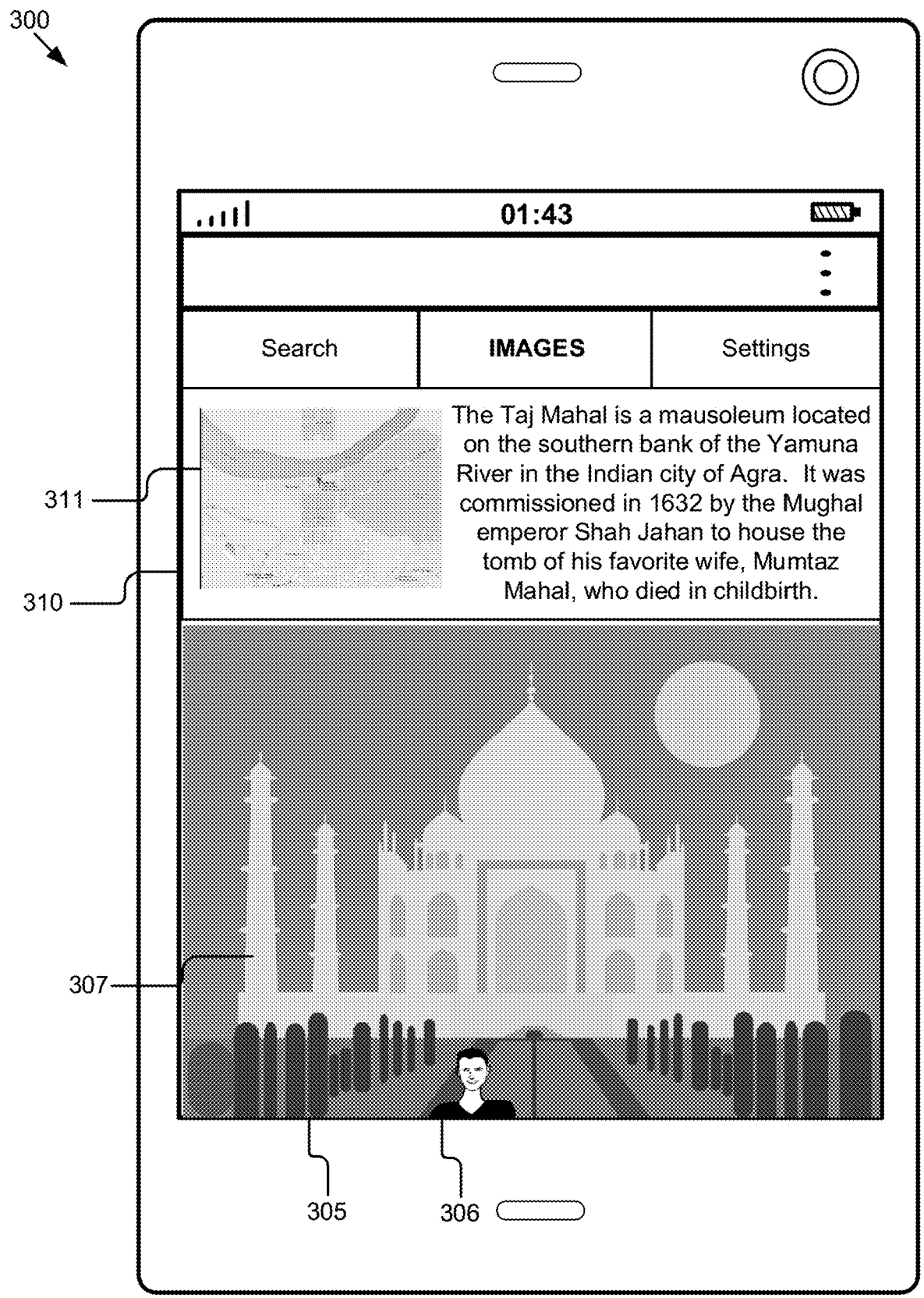
FIG. 3A illustrates a graphic representation of a user interface operable to provide additional information about entities in an image.

The additional information may take many forms. Turning to FIG. 3A, a graphic representation 300 of a user interface operable to provide additional information about entities in an image is illustrated. For example, the image 305 is of the user's friend 306 standing in front of the Taj Mahal 307. The user may select the Taj Mahal, for example, by selecting within the boundary of the Taj Mahal 307. The user interface module 210 may provide a background and historical summary of the Taj Mahal in a margin 310 along with a map 311 of where the Taj Mahal is located in India. In some implementations, the entity may be further subdivided such that the search module 206 may determine that the user selected one of the Taj Mahal's minarets and the search module 206 may provide additional information about the minaret, such as a unique story about the minaret. The user may select his friend's face. The user interface module 210 may, upon user consent, provide the user with his friend's social media feed or a portion of the social media feed that corresponds to the trip to the Taj Mahal, a snapshot of his friend's itinerary while traveling through India on this trip with this portion of the trip highlighted in the visualization, etc.

Figure 3B:
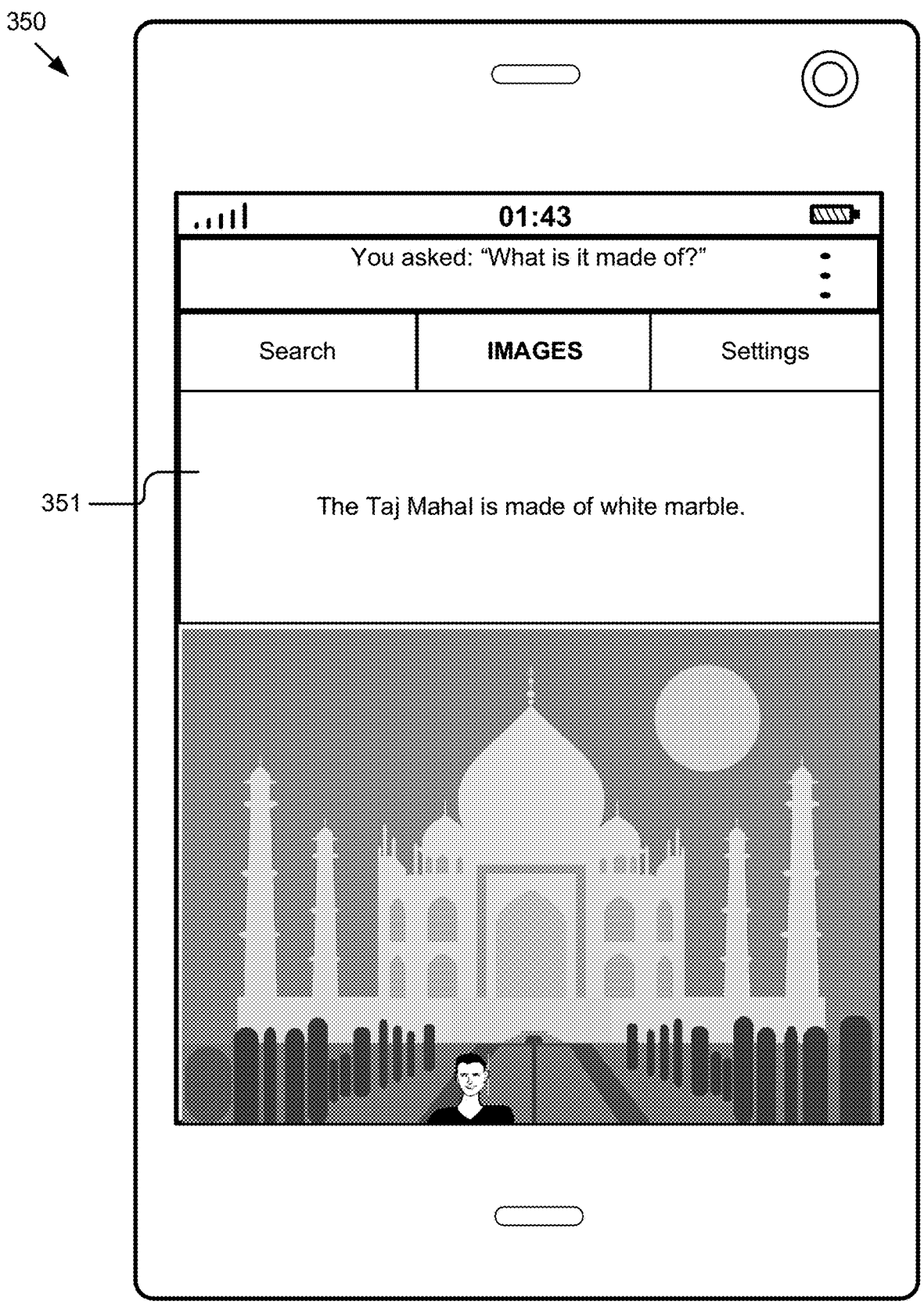
FIG. 3B illustrates a graphic representation of another example of a user interface operable to provide information about an entity in an image.

FIG. 3B illustrates a graphic representation 350 of another example of a user interface operable to provide information about an entity in an image. In this example, the boundary generated by the image processing module 202 may be the same as in FIG. 3A. The image assistant 208 may detect a verbal query that identifies an entity within a boundary. The query may be a follow on to the interaction illustrated in FIG. 3A. Since the user was already asking about the entity, the image assistant 208 determines that when the user asks "What is it made of" that "it" refers to the Taj Mahal. The image assistant 208 may retrieve the additional information to determine that the Taj Mahal is made of marble.

In another example, the image is of a child standing in front of a Tesla Model S sedan. The image processing module 202 may generate boundaries around the child and the Tesla Model S sedan. The user may select within the boundary of the Tesla Model S to learn more about it. The user interface engine 212 may provide the user with a summary of information about the Tesla Model S in the margin. The summary might include the manufacturer's suggested retail price, the range, horsepower, information about Tesla, nearby dealers, marketing videos, etc. Another example may include generating additional boundaries for the child in the image. For example, the image processing module 202 may generate a boundary around the child's articles of clothing such that, responsive to the user selecting within the boundary of the child's jacket, the user interface module 210 provides a product overview with a three-dimensional interactive image of the jacket, a description, pricing, retailer information, and shipping information. The user interface may also include a "buy" button (or another type of icon) that allows for a single-click purchase via a retailer associated with a third-party server 120 if the user provided financial information to the image application 103. Yet another example may include receiving a selection of an image of a flower and providing information about the type of flower; receiving a selection of an image of an animal and providing information about the animal; receiving a selection of a building and providing information about the building, notable factoids, a location of the building on a map, etc.; receiving a selection of an image of an ocean taken on a beach and providing a map with the ocean and beach labelled, providing information about a hotel associated with the beach, etc.; and receiving a selection of an image of food and providing information about the restaurant where the image was taken, reviews of the restaurant, a menu from the restaurant, etc.

In some implementations, the labels may be associated with the image itself and selecting any portion of the image may result in the user interface module 210 providing information about all entities in the image. Alternatively, the user interface module 210 may provide a subset of the information, such as the most contextually relevant aspects of the image. For example, for an image that includes the Taj Mahal, a Honda car, and a tree, the most contextually relevant aspect of the image may be the Taj Mahal based on comparing the number of times people access information about each of those entities or another metric known to those of ordinary skill in the art. In some implementations, contextual relevancy may be personalized for the user. For example, if based on the user's browser history, as retrieved from a third-party server 120, the user is searching for different types of cars, the image processing module 202 may prioritize additional information about the Honda over the other additional information.

In some implementations, the selection may be a verbal command, such as a user stating "Show me information about the minaret," "tell me more about that car," "what kind of jacket is Lisa wearing," "what beach was this taken at," "what ocean is that," "tell me about that church," etc. The user interface module 210 may generate a verbal description of the additional information instead of providing a visual representation of the additional information.

In the above description of the image processing module 202, the steps may be performed based on machine learning. For example, the image processing module 202 may use a set of training data as a guide where secondary annotations and labels were manually associated with an image or automatically generated but manually reviewed to confirm accuracy. The image processing module 202 may use the training data to learn image classifiers to generate the secondary annotations and labels.

The indexing module 204 may be operable to generate an index. In some implementations, the indexing module 204 may be a set of instructions executable by the processor 235 to generate an index. In some implementations, the indexing module 204 may be stored in the memory 237 of the computing device 200 and can be accessible and executable by the processor 235.

In some implementations, the indexing module 204 generates an index from images that are associated with one or more labels where the labels include metadata, one or more primary annotations, and one or more secondary annotations. The indexing module 204 advantageously creates a structured format for organizing images that improves the ability to search for the images using a search query and reduces the computational expense and time needed to retrieve images that match the search query.

The indexing module 204 may generate an index that is a graph where the images represent nodes in the index and the edges are based on the one or more labels associated with the corresponding images. For example, a machine learning algorithm may create a graph by comparing the images to be indexed to images with known labels, determining a similarity between the images, and defining edge weights based on the similarity. In some implementations, the machine learning algorithm is a label propagation algorithm for graph-based semi-supervised learning. The indexing module 204 may take as input (1) an undirected graph containing labeled and unlabeled nodes and (2) seed labels and weights for labeled nodes in the graph; and compute a label distribution for each node in the graph in each iteration.

The indexing module 204 may map the one or more labels to one or more confidence scores. The confidence score may indicate an extent to which a label applies to a corresponding image. For example, for an image of a small dog, the indexing module 204 may assign a confidence score indicating that the image strongly represents a "small dog" label and a confidence score indicating that the image weakly represents a "large dog" label.

In some implementations, the indexing module 204 determines the confidence score to assign to each of the one or more labels based on comparing a particular image to images that include confirmed labels. For example, the indexing module 204 compares a first image of a Boston Terrier to an image associated with a "dog" label to determine whether the images are visually similar. The indexing module 204 may determine visual similarity based on image recognition, comparing histograms of the images, etc. The indexing module 204 may assign the confidence score based on a degree of visual similarity.

Figure 4A:
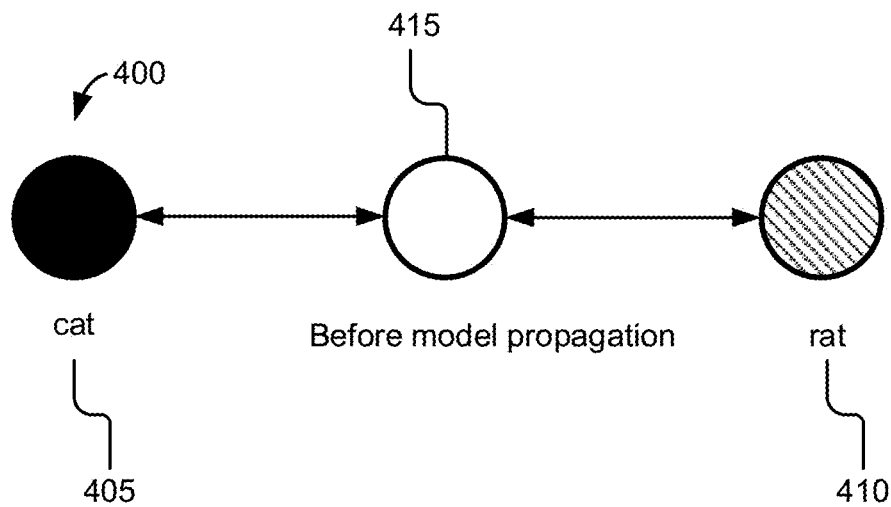
FIG. 4A illustrates a graphic representation of a graph before model propagation is performed.

Turning to FIG. 4A, a graphic representation of a graph 400 before model propagation is illustrated. In this example, node 405 is an image associated with a "cat" label, node 410 is an image associated with a "rat" label, and node 415 is an unlabeled image of a hairless cat. The indexing module 204 may perform model propagation by comparing the image represented by node 415 to the images represented by nodes 405 and 410 to determine the visual similarity between the images. Since the hairless cat looks like a cat, the indexing module 204 may assign a confidence score to the image represented by node 415 that indicates that the image strongly resembles a cat. Since the hairless cat looks slightly similar to a rat, the indexing module 204 may assign a confidence score to the image represented by node 415 that indicates that the image slightly represents a rat.

Figure 4B:
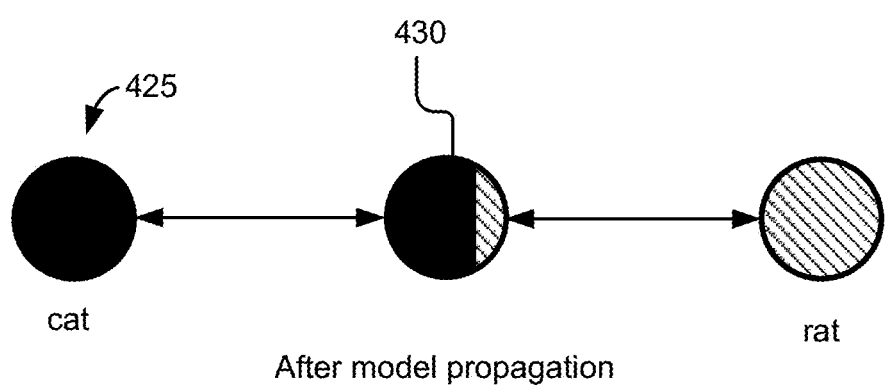
FIG. 4B illustrates a graphic representation of a graph after model propagation.

Turning to FIG. 4B, a graphic representation of a graph 425 after model propagation is illustrated. The unlabeled image represented by node 415 of FIG. 4A is now illustrated as a node 430 associated with a labelled image that includes confidence scores based on the comparison of the unlabeled image to the labelled images. The node 430 associated with the labelled image represents the extent to which the confidence scores indicate that the labels apply to the labelled image. Specifically, the node 430 is illustrated to indicate that the labelled image strongly resembles a cat and slightly resembles a rat.

The search module 206 may receive search queries and perform actions based on the search queries. In some implementations, the search module 206 may be a set of instructions executable by the processor 235 to receive the search queries and perform actions. In some implementations, the search module 206 may be stored in the memory 237 of the computing device 200 and can be accessible and executable by the processor 235.

The search module 206 may receive a search query from a user that includes user-generated search terms for one or more images associated with the user. For example, the search module 206 receives a search query that is a request for images of a particular user, a particular entity, from a particular time period, from a particular location, etc. The search module 206 may receive search queries that include terms that the search module 206 may match to corresponding place labels. For example, the search module 206 may identify user-generated search terms that correspond to a home place label (e.g., "Show me pictures of home"), a work place label, an educational place label, or a semantic place of interest place label.

In some implementations, the search module 206 receives a search query that includes user-generated search terms from a user and categorizes the user-generated search terms to better match the user-generated search terms with matching images. For example, the search module 206 may retrieve the same matching images based on the following different search queries: "Show me pictures of the Super Bowl," "Show me pictures from the football game," and "Show me pictures from the game."

The search module 206 may translate user-generated search terms into categorized search terms where the categories include a date, a time (including a time range), a location, an altitude, or a direction. Regarding a date, the search module 206 may categorize the following search terms as follows: "Pictures from Aug. 1, 2014" is categorized based on the specific date, "Pictures from Friday" is categorized based on the most recent day of the week, "Pictures from yesterday" is categorized based on the prior day, "Pictures from the day before yesterday," is categorized based on the date from two days ago, "Pictures from last week" is categorized based on the date from the prior week, "Pictures from last month" is categorized based on the date from the prior month, "Pictures from last year" is categorized based on the date from the prior year, "Pictures from Christmas day" is categorized based on the holiday being translated to the corresponding date, and "Pictures from the Super Bowl" is categorized based on the event being translated to the corresponding date and location. Regarding time, the search module 206 may categorize search terms as follows: "Pictures from 8 am" is categorized based on the specific time and "Pictures from this morning" is based on the period of time being translated to the corresponding time range.

Regarding location (e.g., latitude and longitude coordinates), the search module 206 may categorize the following queries to include their semantic location: "Pictures from San Francisco" is categorized based on the neighborhood, city, region, and country; "Pictures from the Exploratorium" is categorized based on a specific business or place of interest, "Pictures from near the Bay Bridge" is categorized based on a vicinity of the place of interest, "Pictures from 17$^{th}$ St." is categorized based on the specific street, "Pictures from near 24$^{th}$ and Church St." is categorized based on the corresponding intersection, "Pictures from home" is categorized based on the inferred home location of the user, "Pictures from work" is categorized based on the inferred work location of the user, "Pictures from café across from Eiffel Tower" is categorized by inferring the place of interest based on proximity to the place of interest, and "Pictures from 49ers game" is categorized based on categorizing the 49ers game to a place of interest.

Regarding altitude, the search module 206 may categorize search queries as follows: "Pictures taken from Golden Gate Bridge" is categorized based on a place of interest confirmed using altitude and "Pictures taken on the airplane" is categorized based on an airplane photo being confirmed using altitude. Regarding direction, the search module 206 may categorize search queries as follows: "Pictures with view of the Pacific Ocean" is categorized from a confirmed view based on direction, "Pictures of the Eiffel Tower" is categorized from a confirmed place of interest based on direction, and "Pictures of the Taj Mahal's Eastern minaret" is categorized based on confirming a direction.

In some implementations, the search module 206 accesses a third-party server 120 from FIG. 1 to obtain additional information in real-time to categorize user queries. The search module 206 may query a third-party server 120 that maintains a knowledge graph or a search engine. The search module 206 may infer from a query that a date, a location, an entity, or another type of additional information is needed. The search module 206 may use the additional information to translate the one or more user-generated search terms into categorized search terms.

For example, using the example above of a user asking "Show me pictures from Christmas day," the search module 206 may need additional information about the date that corresponds to "Christmas day." The search module 206 may query the third-party server 120 to determine that "Christmas day" corresponds to the date December 25 and query the index for images that were captured on 12-25-2014. Similar situations where the search module 206 may query the third-party server 120 for additional information include the user asking for pictures of the Macy's Day Parade, Memorial Day, and the Labor Day long weekend.

In another example from above, the search module 206 may determine that the user asking "Show me pictures from the 49ers game" needs additional information to search for images corresponding to "49ers." The search module 206 may query the third-party server 120 to determine that "49ers" is the name of a football team. In some embodiments, the search module 206 queries the third-party server 120 iteratively to determine a type of data corresponding to the "49ers," i.e. that "49ers" is an entity and not a location, etc. In some implementations, the search module 206 may obtain additional information about the "49ers" including a schedule containing venue information, dates, and times. The search module 206 may cross-reference the additional information with latitude and longitude coordinates of the location where the 49ers played, a date of the game, and a time of the game and use the additional information to identify corresponding images from the index.

In yet another example from above, the search module 206 may determine that "Show me pictures from the Boston Marathon" needs additional information to translate the query to include a location and one or more dates corresponding to the Boston Marathon that may be used to search the index for images. In another example, the search module 206 may receive "Show me pictures from Eastern Canada" and query the third-party server 120 to obtain information about the provinces in Eastern Canada. The search module 206 may search the index for images that were captured in the provinces in Eastern Canada.

The search module 206 may access multiple third-party servers 120 to obtain the additional information for translating user-generated search terms into categorized search terms. For example, the search module 206 may receive the search query "Show me pictures from the banks of the Yamuna River" and query a first third-party server 120 to determine that "Yamuna" is a river in India. Next, the search module 206 may query a second third-party server 120, such as a third-party server 120 that provides mapping services, to determine the latitudes and longitudes of a bounded area around the area of the Yamuna River including its banks. The search module 206 may then search the index to identify images that were captured within the bounded area. Other examples of this process may include identifying a bounded area for a neighborhood or area, such as Fisherman's Wharf or Noe Valley, which are neighborhoods in San Francisco.

In some implementations, the search module 206 may translate user-generated search terms into inferred search terms by using the index to expand the grammar or expressions in the search terms. The inferences may apply to a number of people in an image, a distinction between outdoor and indoor images, scenery recognition, and daytime or nighttime attributes.

For inferences made based on the number of people in an image, the search module 206 may identify user-generated search terms that are indicative of a particular number. For example, the search module 206 may receive the search query "Show me photos of the family on the beach in Costa Rica" and determine that the user-generated search term "family" may be translated to the inferred search terms "three or more people." Next, the search module 206 may search for images that include three or more people. In another example, the search module 206 may receive the search query "Show me the pictures of me in front of the Taj Mahal" and translate "me" to the inferred search terms "one individual." In yet another example, the search module 206 may receive the search query "Show me the team photo from last week" and translate the user-generated search terms "team photo" to the inferred search terms "more than three."

For inferences made based on an indoor and outdoor distinction, the search module 206 may determine that the default inferred search term is "outdoor." For example, the search module 206 may receive the search query "Show me pictures of St. Peter's Basilica" and infer that the user is requesting outdoor pictures of St. Peter's Basilica. In another example, the search module 206 may receive the search query "Show me pictures from inside St. Peter's Basilica" and determine that the inferred search term is "indoor" based on the user explicitly requesting "pictures from inside."

For inferences made based on scenery recognition, the search module 206 may identify user-generated search terms that correspond to scenery attributes. For example, the search module 206 may receive the search query "Pictures of the sunset on the beach" and determine that the user-generated search terms correspond to the following inferred search terms: ocean, beach, lake, and sunset. In this example, the search module 206 may determine that "beach" corresponds to multiple types of water bodies (i.e., ocean, beach, and lake). In another example, the user-generated search term "tree" may correspond to the inferred search terms "tree" and "forest." In yet another example, the search module 206 may infer different weather conditions based on the user-generated search terms. For example, the user-generated search term "cloudy" may correspond to "fog" and "rain."

For inferences made based on daytime and nighttime attributes, the search module 206 may identify user-generated search terms that correspond to daytime and nighttime attributes. For example, the search module 206 may receive the search query "Pictures of Tokyo at night" and determine that the user-generated search term "night" corresponds to images captured after sunset. In some implementations, the search module 206 may identify matching images based on a level of light in the images, a capture time corresponding to being after sunset, etc.

In some implementations, the search module 206 receives a search query that includes user-generated search terms from a user for one or more images associated with the user. The search module 206 may generate, based on the user-generated search terms and an index, one or more suggested search terms for the user that autocomplete the user-generated search terms. In some implementations, the search module 206 may generate the suggested search terms based on aggregated label output from the index. Specifically, the search module 206 may generate suggested search terms by identifying labels in the index that correspond to the search query, determining the frequency of the labels, and ranking the labels. For example, if the user inputs the partial user query "Pictures of m" the search module 206 may determine that the index includes the following labels that begin with "m" in order of decreasing numbers: mom, Martha, and monkey. As a result, the search module 206 may suggest "mom" to autocomplete the search query or provide a ranked list of autocomplete suggestions. The suggested search terms may include keywords or natural language expressions that are generated automatically based on the user-generated search terms and the index.

In some implementations, the search module 206 expands the grammar of one or more terms in the user query to identify related search terms and find images that match the related search terms. The search module 206 may rank the search results based on correlation to the original user query. For example, where the user query is for "photos of puppies" the search module 206 may identify matching images with "photos of puppies" as part of a label. The search module 206 may expand the grammar and identify images with labels for any type of dog and rank the search results with small dogs having precedence over large dogs. As a result, the search module 206 may capture images that match the user's desired intent in the event that the user uses "puppies" as a generic term for all dogs.

In some implementations, the search module 206 identifies search results that include images that match the search terms. The search module 206 may rank the search results based on confidence scores associated with the corresponding images. For example, where the search query is for "images of Taj Mahal" the search module 206 may identify matching images with "Taj Mahal" as part of a label. The search module 206 may identify the confidence score for "Taj Mahal" associated with each of the matching images and rank the search results based on the corresponding confidence scores. In some implementations, the search module 206 may select search results with confidence scores that meet a predetermined threshold. Where an image is associated with multiple confidence scores, the search module 206 may determine whether a weighted sum of the multiple confidence scores meet a predetermined threshold. The search module 206 may provide at least a portion of the ranked list of search results to the user based on the search results that are associated with confidence scores that meet a predetermined threshold.

In some implementations, the search module 206 may perform filtering of images based on indicators in search queries. The filtering may include performing subsequent narrowing of the search results. For example, the search module 206 may receive a first search query for images associated with the user. In this example, the first search query may be: "Show me pictures from San Francisco." The search module 206 may receive a second search query. The search module 206 may determine that the second search query is to be applied to the first search results. For example, the second search query may be: "Just show me the ones from last month." The search module 206 may provide the user with second search results that are filtered from the first search results and that match the second search query. In this example, the second search results may include pictures from San Francisco taken last month. The search module 206 may receive a third search query with an indication that the third search query is to be based on the second search results. For example, the third search query may be "Just show me the ones near the Golden Gate Bridge."

In some implementations, the search module 206 may perform searches of images based on complex queries with multiple attributes. For example, the search module 206 may receive the following search query from a user: "Show me pictures from San Francisco taken last month." The search module 206 may translate the user-generated search term "San Francisco" to categorized search terms that correspond to latitude and longitude coordinates for San Francisco, translate the user-generated search terms "last month" to categorized search terms that correspond to a time range for "last month," and search for images that match the categorized search terms. In another example, the search module 206 receives the following search query from a user: "Show me daytime pictures from the top of the Eiffel Tower." The search module 206 may translate the user-generated search term "daytime" to categorized search terms that correspond to a time range for "daytime," translate the user-generated search term "top" to images at an altitude that corresponds to the "top" of the Eiffel Tower, translate the user-generated search terms "Eiffel Tower" to categorized search terms for the place of interest, and search for images that correspond to the time range for "daytime" images at an altitude that corresponds to the "top" of a location that corresponds to the "Eiffel Tower."

In some implementations, the search module 206 may perform automatic labelling based on inferring information from a search query from a user and image recognition results. For example, the user may provide the following search query: "Show me photos of Samantha and I on the beach in Costa Rica." The search module 206 may identify images that were taken in Costa Rica within proximity of a beach that include two people, one of which is the user. The image processing module 202 may have determined the identity of the user in the images based on an image recognition search, comparing the image to previously tagged images of the user, comparing the image to a public profile of the user, etc. If the only images that match the previous criteria include one other person, the search module 206 may infer that the second user is "Samantha" and instruct the index module 204 to associate the corresponding images with an automatic label for Samantha. If there are images with multiple second people in the images and/or as an additional confirmation step, the search module 206 may compare the image of the second user to images of known people to identify the images that include Samantha. For example, the search module 206 may request profile images from a social network application and compare the image of the second user to the profile images to reduce the number of comparisons to be performed. The search module 206 may then instruct the index module 204 to associate the corresponding images with an automatic label for Samantha. In some implementations, the image assistant 208 may display the corresponding images to the user and ask the user to confirm that the second person is Samantha before automatically labelling the images.

The image assistant 208 may be operable to organize images for a user. In some implementations, the image assistant 208 may be a set of instructions executable by the processor 235 to organize images for the user. In some implementations, the image assistant 208 may be stored in the memory 237 of the computing device 200 and can be accessible and executable by the processor 235.

The image assistant 208 may help a user to automatically organize images, search for images, recommend images, provide additional information about entities in images, add special effects to images, share images, and backup images. In some implementations the image assistant 208 may use a combination of voice interaction and instruction of the user interface module 210 to generate a user interface. The image assistant 208 may provide the user with options to choose from the user interface at each step of interaction or to continue using voice commands. The image assistant 208 may provide this option regardless of the type of user device 115 the user is employing to interact with the image assistant 208.

The image assistant 208 may interact with the user to obtain identifying information that is used to categorize images and, responsive to receiving the identifying information from the user, instruct the indexing module 204 to update the index by adding the identifying information to corresponding images. For example, the image assistant 208 may ask the following verbally or by providing text: "I need to confirm a few things to organize your photos. It will just take a few minutes of your time. Is this you?" The image assistant 208 may instruct the user interface module 210 to display one or more images that the image assistant 208 identified as potentially including the user.

Figure 5:
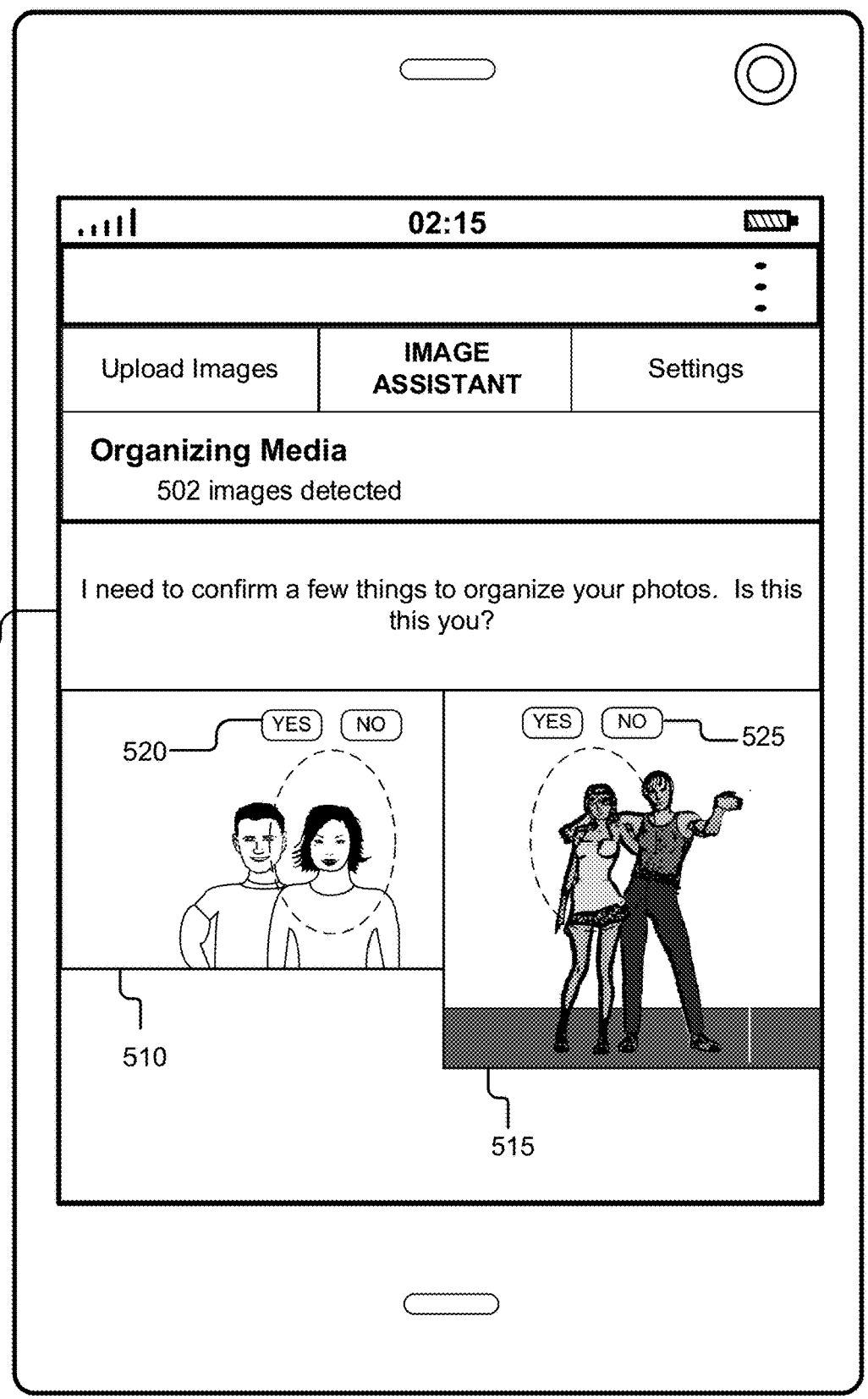
FIG. 5 illustrates a graphic representation of a user interface operable to ask users clarifying questions.

Turning to FIG. 5, a graphic representation 500 of a user interface operable to provide clarifying questions to the user is illustrated. In this example, the image assistant 208 organizes images associated with the user and identifies 502 images to be organized. The user interface module 210 provides a clarifying question in a panel 505 of the user interface and images 510, 515 where the image assistant 208 requests confirmation that the user was properly identified. In this example, the user may confirm or reject the user's identification using a "yes" button 520 and a "no" button 525. If the user identifies either of the images as properly identifying the user in the image, the image assistant 208 may instruct the index module 204 to add a label to the image that identifies the user. The label may include at least one of the user's name, "me," and "I" so that the search module 206 may identify images when the user asks for, for example, "Show me images of me." If the user indicates that both images improperly identify the user, the image assistant 208 may instruct the user interface module 210 to identify additional images that may include the user.

The image assistant 208 may organize the images by instructing the user interface module 210 to provide images of people that frequently appear in images associated with the user. For example, the image assistant 208 may identify people that appear in a threshold number of the images (e.g., 5%, 10%, etc.). The image assistant 208 may instruct the user interface module 210 to display images of a person to be identified and ask the user: "Can you tell me who this person is that appears in these photos?" The image assistant 208 may receive different types of terms for the person in the images, such as "mom" or the full name of the user's mom. The image assistant 208 may ask additional clarifying questions. For example, the image assistant 208 may respond with "Can you tell me your mom's full name so I can properly tag the photo? This will also make sharing of photos with her easier in the future." The user may respond, for example, with "Samantha Brown." The image assistant 208 may give the user cues on how to search for the images in the future by stating: "Great! I will also tag photos of her as 'mom' so you can say things like 'share with mom' in the future."

In some implementations, the image assistant 208 accesses third-party information to confirm information from the user or to help make inferences to reduce the number of questions to present the user. For example, if the user identifies a person in an image as "Robert," the image assistant 208 may access social media profiles, email profiles, etc. to determine that "Robert" refers to "Robert Stein." In some implementations, the image assistant 208 may generate a confidence score that indicates a match between the person in the image and the identification. If the confidence score meets a threshold value, the image assistant 208 may instruct the indexing module 204 to add a label to the image with the person's identity. If the confidence score fails to meet the threshold value (e.g., if the confidence score falls below the threshold value), the image assistant 208 may ask the user for confirmation that the image includes "Robert Stein."

In some implementations, the image assistant 208 receives a user query with one or more user-generated search terms that correspond to one or more labels. For example, the image assistant 208 may ask the image assistant 208 to "Show me pictures of me." The image assistant 208 may provide the user with one or more corresponding images that include the user. In some implementations, the image assistant 208 determines one or more ambiguities from the user-generated search terms and provide the user with a question to clarify the one or more ambiguities from the user-generated search terms. For example, the user may provide the following search query: "Show me the pictures of the ski trip." In this example, the image processing module 202 may have added "skiing" labels to three different ski trips. As a result, the image assistant 208 may determine that there are three different clusters of images from which to display images associates with skiing. The image assistant 208 may ask the user to specify which of the ski trips the user would like to see. For example, the image assistant 208 may instruct the user interface module 210 to generate a user interface that displays the question in text form. The image assistant 208 may also instruct the user interface module 210 to include an image from each of the ski trips, an identifying of the ski trips based on, for example, their dates or the name of the resorts (e.g., Resort A, Resort B, Resort C) along with the question. The question may be provided in other formats, such as an audio prompt. If the user provides an answer to the question, the image assistant 208 may update the ambiguous search terms in the user query. Continuing with the example above, the image assistant 208 may replace "ski trip" with "skiing" and "Resort A" in the user query to obtain images associated with the ski trip to Resort A.

In another example, the image assistant 208 may offer suggestions or options to disambiguate from multiple similar categories of images. For example, the user may ask: "Show me pictures from the football game." The image assistant 208 may identify images that include locations of football stadiums, cluster the images of different games associated with different dates and locations, and query a third-party server 120 for specific football games that took place on those dates at those times. The image assistant 208 may respond: Would you like to see the pictures you took at the New England Patriots versus Dallas Cowboys game, or the Chicago Bears versus New York Giants game?"

In yet another example, the image assistant 208 may offer suggestions or options to disambiguate from multiple places of interest being associated with the same location category. For example, the user may ask: "Show me photos from the museum." The image assistant 208 may identify from the images associated with the user that the images include three different places of interest that are designated as museums. The image assistant 208 may respond: "Would you like to see the pictures you took at The British Museum, the Science Museum, or the Natural History Museum?" The user's response to the image assistant 208 may include options other than a selection of one of the three museums. For example, the user may respond: "It's the museum near Bloomsbury Theatre." The image assistant 208 may query a third-party server 120 that hosts a search engine, a mapping application, etc. to determine the distance between the Bloomsbury Theatre and the three museums and to identify that The British Museum is the closest. Thus, the image assistant 208 may combine multiple pieces of information from multiple data sources to compute attributes to disambiguate between image clusters.

In some implementations, the image assistant 208 may ask a follow-up question responsive to having a lack of information to complete a search for the user. For example, the user may state: "Show me pictures from Samantha's birthday party." The image assistant 208 may not have access to the date corresponding to Samantha's birthday. The image assistant 208 may query third-party servers 120 for the information. If the image assistant 208 cannot locate the date, the image assistant 208 may ask the user: "Do you know when Samantha's birthday was?" Once the image assistant 208 receives an answer, the image assistant 208 may generate labels that include "Samantha's birthday party" for the matching images. In some implementations where the image assistant 208 does not automatically access the third-party servers 120 to obtain the date of Samantha's birthday, the user may be able to instruct the image assistant 208 to check the third-party servers 120. For example, the user may be able to specify a data source that may include the information (e.g., "Check my calendar.").

In another example, the user may ask "Show me pictures from dad's house." The image assistant 208 may have already added "dad" as a label to images that include the user's father but the image assistant 208 may not have access to the location of dad's house. The image assistant 208 may ask the user: "Can you tell me your dad's address (this will remain private)?" Responsive to receiving the address from the user, the image assistant 208 may compute the street address to latitude and longitude coordinates to identify images taken at that location. The image assistant 208 may also add "dad's house" as a label to the matching images.

In some implementations, the image assistant 208 may confirm that inferences made by the image application 103 were correct. For example, the image assistant 208 may receive a search query from the user that uses a place label (e.g., "Show me pictures from work." The image assistant 208 may identify images that include a work place label, provide the user with the corresponding images, and ask the user to confirm that the images were properly labelled.

As discussed above, the image assistant 208 may provide additional information to the user responsive to the user asking questions about an entity in an image. The image assistant 208 may receive verbal user queries and determine what entity the user is asking about. For example, turning back to FIG. 3A, the user may ask "What is that building?" The image assistant 208 may identify from the image which of the entities includes a "building" label. The image assistant 208 may then update the user query to state "What is the Taj Mahal" and communicate with the search module 206 to obtain additional information about the Taj Mahal to provide to the user. In some implementations, the image assistant 208 may expand the grammar of the search terms and obtain additional information about the expanded search terms. For example, the image assistant 208 may expand "What is that building?" to include "What is that mausoleum" and communicate with the search module 206 to obtain additional information about mausoleums.

In some implementations, the image assistant 208 identifies a user based on the user's voice and matches the index for the user. Where the image application 103 is stored on a voice-based television system, set-top box, tablet, or desktop computer accessed by multiple members of a family, the image assistant 208 may receive a search query from the user and identify the user based on a voice signature. For example, the image assistant 208 may receive "Show me pictures of me in front of the Taj Mahal." The image assistant 208 may provide different search results depending on the user even though the entire family went on the same trip to India.

In some implementations, the image assistant 208 receives instructions from the user to send images to a person associated with a third-party application hosted by the third-party server 120 of FIG. 1. The instructions may be verbal or textual. The image assistant 208 may determine a contact profile associated with the person. For example, the user may state: "Share the Hawaii vacation album with John." The image assistant 208 may confirm the details by providing an image of John and asking the user: "Do you mean John D?" If the user responds "Yes," the image assistant 208 may ask: "How do you want me to share the album?" The user may specify the type of application to send the images to and the image assistant 208 may provide the person with the one or more images based on the contact profile. For example, if the user responds "Email him a link to the album," the image assistant 208 may identify the email address for John Halprin, for example, by providing a third-party server 120 that maintains the user's email application with a link to the album and instructions to send the link to the email address for John Halprin.

In some implementations, the image assistant 208 edits images for a user using voice commands. Example edit instructions may include: "crop out the person in the photo," "make this photo black and white," "brighten it up," and "darken it." In some implementations, the image assistant 208 may order products that are associated with a specified image. For example, the user may instruct the image assistant 208 to: "Order a 8×10 poster with the photo and have it framed with a black frame. Have it delivered to Samantha's house with a gift card for Samantha." In some implementations, the image assistant 208 may receive a request from the user to purchase an item related to an entity in an image and purchase the item for the user. The request may be audio, such as "Purchase the jacket in the image" or the user may select the entity in the image. Other options may include ordering a coffee mug or t-shirt with the image on it. In some implementations, the image assistant 208 may order an item in an image for the user. For example, the user may instruct the image assistant 208 to order a jacket depicted in an image.

The user interface module 210 may be operable to provide information to a user. In some implementations, the user interface module 210 can be a set of instructions executable by the processor 235 to provide the functionality described below for providing information to a user. In some implementations, the user interface module 210 can be stored in the memory 237 of the computing device 200 and can be accessible and executable by the processor 235.

In some implementations, the image assistant 208 purchases entities in an image for a user. The entities may be identified by the user via voice commands.

The user interface module 210 may receive instructions from the other modules in the image application 103 to generate graphical data operable to display a user interface. For example, the user interface module 210 may generate a user interface that displays images captured by a user, a search bar where the user may enter a search for images, etc. In some implementations, the user interface module 210 may display images that include boundaries around entities in the images. Responsive to receiving a selection within a boundary of an entity, the user interface module 210 may generate additional information about the entity.

Example Methods

Figure 6A:
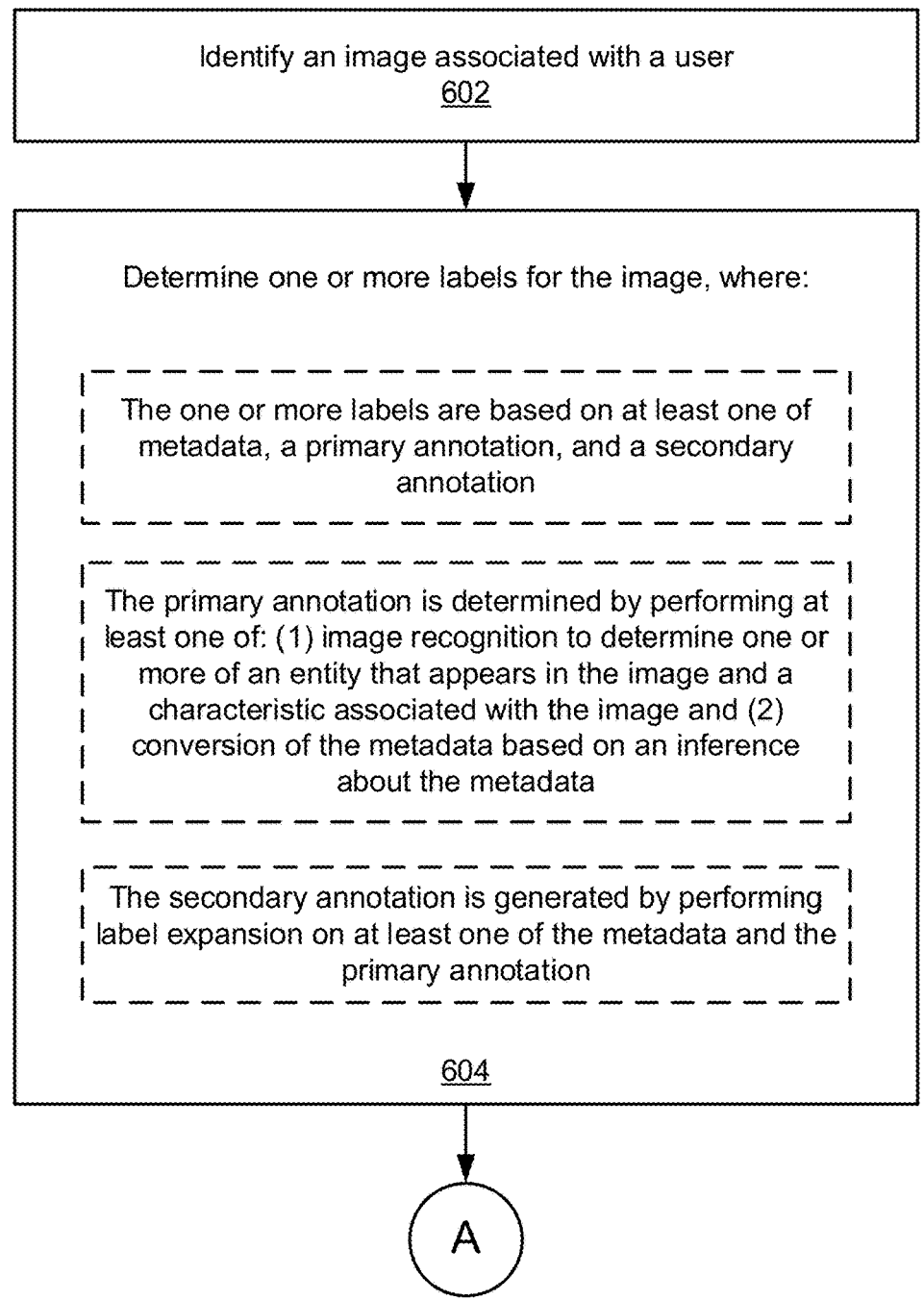
FIGS. 6A-6B is a flowchart of an example method to organize images.
Figure 6B:
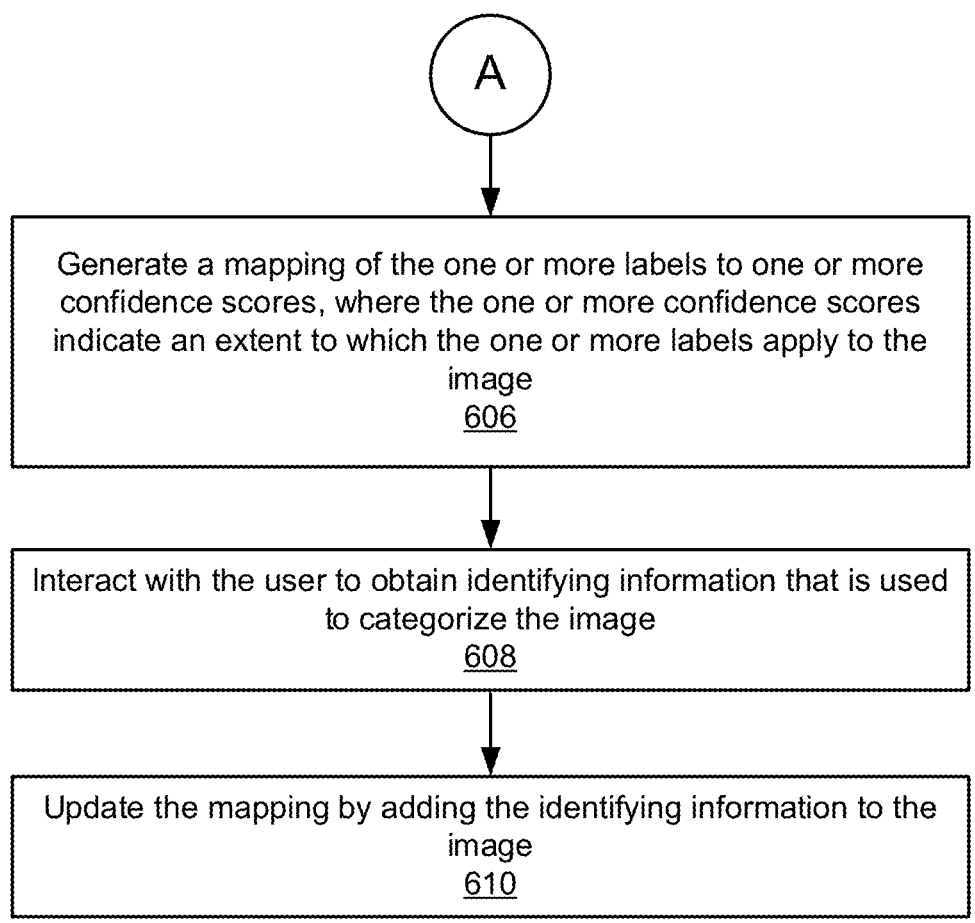

FIGS. 6A-6B is a flowchart of an example method to organize images. The method 600 may be implemented by an image server 101, a user device 115 or a combination of the image server 101 and the user device 115, using the image application 103 illustrated in FIG. 1. The image application 103 may include the image processing module 202, the indexing module 204, and the search module 206 illustrated in FIG. 2.

At block 602, an image associated with a user is identified. The image may be stored on a user device or stored in the cloud.

At block 604, one or more labels are determined for the image, where: the one or more labels are based on at least one of metadata, a primary annotation, and a secondary annotation, the primary annotation is determined by performing at least one of: (1) image recognition to determine one or more of an entity that appears in the image and a characteristic associated with the image, and (2) conversion of the metadata based on an inference about the metadata, and the secondary annotation is generated by performing label expansion on at least one of the metadata and the primary annotation.

At block 606, a mapping of the one or more labels to one or more confidence scores is generated, where the one or more confidence scores indicate an extent to which the one or more labels apply to the image. In implementations where multiple images are associated with the user, the mapping may include a graph of the images where the images represent nodes and each edge between the nodes is based on the one or more labels associated with corresponding images.

At block 608, an interaction with the user occurs to obtain identifying information that is used to categorize the image. For example, the user may be provided with a request to providing identifying information about the image using visual and audio elements. The user may be provided with a visual of multiple photos of the user and an audio asking the user if the photos are photos of the user. At block 610, the mapping is updated by adding the identifying information to the image. For example, an image that includes the user may be updated with a "me" label so that the user may request "Show me images that include me."

While blocks 602 to 610 are illustrated in a particular order, other orders are possible with intervening steps. In some implementations, some blocks may be added, skipped, or combined.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the implementations can be described above primarily with reference to user interfaces and particular hardware. However, the implementations can apply to any type of computing device that can receive data and commands, and any peripheral devices providing services.

Reference in the specification to "some implementations" or "some instances" means that a particular feature, structure, or characteristic described in connection with the implementations or instances can be included in at least one implementation of the description. The appearances of the phrase "in some implementations" in various places in the specification are not necessarily all referring to the same implementations.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic data capable of being stored, transferred, combined, compared, and otherwise manipulated. It has proven convenient at times, principally for reasons of common usage, to refer to these data as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The implementations of the specification can also relate to a processor for performing one or more steps of the methods described above. The processor may be a special-purpose processor selectively activated or reconfigured by a computer program stored in the computer. Such a computer program may be stored in a non-transitory computer-readable storage medium, including, but not limited to, any type of disk including floppy disks, optical disks, ROMs, CD-ROMs, magnetic disks, RAMs, EPROMs, EEPROMs, magnetic or optical cards, flash memories including USB keys with non-volatile memory, or any type of media suitable for storing electronic instructions, each coupled to a computer system bus.

The specification can take the form of some entirely hardware implementations, some entirely software implementations or some implementations containing both hardware and software elements. In some implementations, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

In situations in which the systems discussed above collect personal information, the systems provide users with an opportunity to control whether programs or features collect user information (e.g., information about a user's social network, social actions or activities, profession, a user's preferences, or a user's current location), or control whether and/or how to receive content from the server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the server.

What is claimed is:

1. A computer-implemented method comprising:
identifying images associated with a user;
for each of the images, determining one or more labels, wherein the one or more labels are based on at least one of metadata, a primary annotation, or a secondary annotation;
generating a mapping of the one or more labels to one or more confidence scores, wherein the one or more confidence scores indicate an extent to which the one or more labels apply to a corresponding image;
receiving from the user a search query that includes two or more user-generated search terms for the images associated with the user, wherein the two or more user-generated search terms include a name of a place of interest and a proximity of the place of interest to a landmark;
translating each of the two or more user-generated search terms into two or more categorized search terms, wherein the categorized search terms correspond to latitude and longitude coordinates for a location based on the proximity of the place of interest to the landmark and a date, a holiday, a time, an altitude, or a direction;
identifying search results by determining a match between the two or more categorized search terms and the one or more labels in the mapping; and
ranking the search results based on the one or more confidence scores indicating the extent to which the one or more labels apply to each corresponding image.

2. The method of claim 1, wherein the one or more labels are based on the primary annotation and further comprising:
generating the primary annotation by performing at least one of:
image recognition to determine one or more of an entity that appears in one or more of the images and a characteristic associated with one or more of the images, or
conversion of the metadata to the primary annotation based on an inference about the metadata.

3. The method of claim 1, wherein:
the secondary annotation is generated by performing label expansion on at least one of the metadata or the primary annotation; and
the label expansion includes expanding the at least one of the metadata or the primary annotation based on a hierarchical taxonomy.

4. The method of claim 3, wherein the label expansion includes expanding the at least one of the metadata or the primary annotation based on at least one of a semantic similarity of the at least one of the metadata or the primary annotation to the secondary annotation or a visual similarity of the at least one of the metadata or the primary annotation to the secondary annotation.

5. The method of claim 1, further comprising:
generating, based on the two or more user-generated search terms and the mapping, one or more suggested search terms for the user that autocomplete the two or more user-generated search terms.

6. The method of claim 1, wherein:
the two or more user-generated search terms further include a name of an event; and
the two or more categorized search terms include the date associated with the event.

7. The method of claim 1, wherein the search query is a second search query and further comprising:
prior to receiving the second search query, receiving a first search query that includes the name of the place of interest;
identifying the search results from multiple matching places of interest; and
requesting the user to identify which of the multiple matching places of interest corresponds to the name of the place of interest.

8. The method of claim 1, further comprising:
identifying a user activity to associate with the location; and
associating a user activity annotation with one or more of the images that are associated with the location.

9. The method of claim 1, wherein the search query is a first search query and the search results are first search results, and further comprising:
receiving from the user a second search query;
determining, based on one or more terms in the second search query, that the second search query is to be applied to the first search results; and
providing the user with second search results that are filtered from the first search results and that match the second search query.

10. The method of claim 1, wherein:
the mapping includes a graph of the images; and
the images represent nodes and each edge between the nodes is based on the one or more labels associated with corresponding images.

11. The method of claim 1, wherein the two or more user-generated search terms further include a name of an event and the two or more categorized search terms include the date and the latitude and longitude coordinates associated with the event.

12. A computer system comprising:
one or more processors coupled to a memory;

an image processing module stored in the memory and executable by the one or more processors, the image processing module operable to identify images associated with a user and operable to, for each image, determine one or more labels for the image, wherein the one or more labels are based on at least one of metadata, a primary annotation, or a secondary annotation;

an indexing module stored in the memory and executable by the one or more processors, the indexing module operable to generate a mapping of the one or more labels to one or more confidence scores, wherein the one or more confidence scores indicate an extent to which the one or more labels apply to a corresponding image; and a search module stored in the memory and executable by the one or more processors, the search module operable to:

receive from the user a search query that includes two or more user-generated search terms for the images associated with the user;

translate each of the two or more user-generated search terms into two or more categorized search terms, wherein the categorized search terms correspond to two or more of a date, a holiday, a time, latitude and longitude coordinates, an altitude, or a direction;

identify search results by determining a match between the two or more categorized search terms and the one or more labels in the mapping;

the search results based on the one or more confidence scores indicating the extent to which the one or more labels apply to each corresponding image;

identifying a user activity to associate with a location; and associating a user activity annotation with one or more of the images that are associated with the location.

13. The system of claim 12, wherein the search module is further operable to:

generate, based on the two or more user-generated search terms and the mapping, one or more suggested search terms for the user that autocomplete the two or more user-generated search terms.

14. The system of claim 12, wherein the search module is further operable to:

retrieve additional information to translate the two or more user-generated search terms into the categorized search terms.

15. The system of claim 12, wherein the search module is further operable to cluster the one or more of the images that are associated with the location based on the user activity.

16. A non-transitory computer storage medium encoded with a computer program, the computer program comprising instructions that, when executed by one or more computers, cause the one or more computers to perform operations comprising:

identifying images associated with a user;

for each of the images, determining one or more labels, wherein the one or more labels are based on a primary annotation, wherein the primary annotation is generated by performing at least one of:

image recognition to determine one or more of an entity that appears in one of the images or a characteristic associated with one of the images and conversion of metadata based on an inference about the metadata;

for at least one of the images that includes the entity, determining a boundary of the entity;

responsive to receiving a selection by the user that is within the boundary of the entity in one of the images, retrieving additional information about the entity;

generating a mapping of the one or more labels to one or more confidence scores, wherein the one or more confidence scores indicate an extent to which the one or more labels apply to a corresponding image;

receiving from the user a search query that includes two or more user-generated search terms for the images associated with the user;

translating each of the two or more user-generated search terms into two or more categorized search terms, wherein the categorized search terms correspond to two or more of a date, a holiday, a time, latitude and longitude coordinates, an altitude, or a direction;

identifying search results by determining a match between the two or more categorized search terms and the one or more labels in the mapping; and ranking the search results based on the one or more confidence scores indicating the extent to which the one or more labels apply to each corresponding image.

17. The computer storage medium of claim 16, wherein the selection of the entity in the one of the images by the user includes a tap, a double tap within the boundary, a long press within the boundary, a predetermined level of pressure for a press within the boundary, drawing a circle around the entity, or hovering over the entity with a pointer.

18. The computer storage medium of claim 17, wherein the additional information about the entity includes a background or historical summary of the entity.

19. The computer storage medium of claim 16, wherein the instructions cause the one or more computers to perform further operations comprising:

obtaining the additional information from a server-hosted knowledge graph; and providing the additional information to the user.

20. The computer storage medium of claim 16, wherein the instructions cause the one or more computers to perform further operations comprising:

associating one or more of the one or more labels with the boundary of the entity in the at least one of the images;

determining the one or more labels that correspond to the entity;

searching for additional information for the entity; and providing the user with the additional information.

* * * * *